United States Patent [19]

Moseley

[11] Patent Number: 4,485,157

[45] Date of Patent: Nov. 27, 1984

[54] SEPARATOR HAVING DIELECTRIC ELASTOMER IN THE PERIPHERY AREA

[75] Inventor: Scott A. Moseley, Elmhurst, Ill.

[73] Assignee: Energy Research Corporation, Danbury, Conn.

[21] Appl. No.: 465,755

[22] Filed: Feb. 11, 1983

[51] Int. Cl.³ .............................................. H01M 2/16
[52] U.S. Cl. .................................... 429/251; 429/252; 429/254
[58] Field of Search ................ 429/252, 251, 249, 254; 204/295, 296

[56] References Cited

U.S. PATENT DOCUMENTS

| | | | |
|---|---|---|---|
| 1,584,248 | 5/1926 | Spencer | 429/82 |
| 2,287,305 | 6/1942 | Haverbeck | 429/252 |
| 2,382,829 | 8/1945 | Strickhouser et al. | 429/147 |
| 3,003,012 | 10/1961 | Duddy | 429/9 |
| 3,141,795 | 7/1964 | Eisler | 429/210 X |
| 3,351,495 | 11/1967 | Larsen et al. | 429/252 |
| 3,701,690 | 10/1972 | Dermody et al. | 29/623.3 |
| 3,723,186 | 3/1973 | Borucka et al. | 429/46 |
| 3,784,414 | 1/1974 | Macaulay | 427/58 X |
| 3,833,424 | 9/1974 | Louis et al. | 429/37 |
| 3,899,355 | 8/1975 | Chiklis | 429/153 |
| 4,068,047 | 1/1978 | Dangel et al. | 429/152 X |
| 4,197,178 | 4/1980 | Pellegri et al. | 204/255 |
| 4,287,276 | 9/1981 | Lundquist, Jr. et al. | 429/251 X |

Primary Examiner—Anthony Skapars

[57] ABSTRACT

A separator comprising a sheet of polymer material containing a filler and having an periphery area whose pores are filled with a dielectric elastomer.

6 Claims, 2 Drawing Figures

SEPARATOR HAVING DIELECTRIC ELASTOMER IN THE PERIPHERY AREA

BACKGROUND OF THE INVENTION

This invention relates to separators and, in particular, to separators for use in metal halogen electrochemical cells.

In cells of the above type such as, for example, zinc bromine batteries, a separator is disposed between the positive electrode assembly and the negative electrode assembly. These assemblies are each fed with a circulating electrolyte and the separator main area in line with the ionic migration between the electrodes acts to retard migration of elemental halogen therebetween and, therefore, maintain satisfactory coulombic efficiency.

The periphery area of the separator is sandwiched between corresponding periphery areas of the electrode assemblies and provides a seal for preventing the circulating electrolyte feeding one electrode assembly from reaching the circulating electrolyte feeding the other electrode assembly. This peripheral area also seals the electrolyte in the cell so as to prevent escape to the outside environment. In conventional practice the electrode assembly peripheries are provided with ribs which, upon application of pressure to the assemblies by end plates, indent the separator periphery area to effect the needed seal. Typical separators used in the above way comprise a polymer material, such as, for example, a high molecular weight polyethylene, formed into a sheet and provided with a filler such as, for example, silica which establishes a porosity for the separator of about 50 percent.

For higher voltage electrochemical cells, using the aforementioned type separator in conjunction with the described sealing techniques results in less than an adequate seal. In particular, due to the required porosity of the separator, the sheet material exhibits little resiliency and, as a result, it becomes extremely difficult to establish a leak-free seal between the material periphery area and the sealing rib of the larger electrode assemblies. Also, it is not readily possible to realign the rib pattern created in the separator with the rib pattern of the electrode assembly after initial compression. As a result, the separator cannot be reused in other cell assemblies. Finally, the separator, once saturated with electrolyte, offers virtually no resistance to the higher voltage of the large cell. This allows shunt currents to pass through the separator between the negative and positive electrode sides causing the cell to short circuit internally.

It is therefore an object of the present invention to provide a separator which can be used in higher voltage electrochemical cells and which does not suffer from the above disadvantages.

SUMMARY OF THE INVENTION

In accordance with the principles of the present invention, the above and other objectives are realized in a separator comprising a polymer sheet material containing a filler and having a periphery area or region filled with a dielectric elastomer. In preferred construction, the elastomer is a cured silicone dielectric resin.

BRIEF DESCRIPTION OF THE DRAWINGS

The above and other features and aspects of the present invention will become more apparent upon reading the following detailed description in conjunction with the accompanying drawings in which.

DETAILED DESCRIPTION

Figure 1:
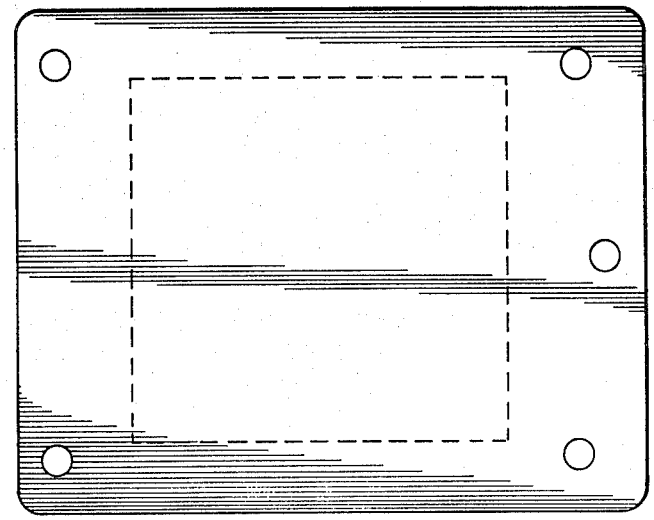
FIG. 1 shows a separator in accordance with the principles of the present invention.

In FIG. 1, the separator 1 is in the form of a sheet of polymer material, preferably, a high molecular polyethylene. The sheet has embedded therein a filler material, preferably, silica so as to provide a resultant porosity of the sheet of approximately 50 percent.

Figure 2:
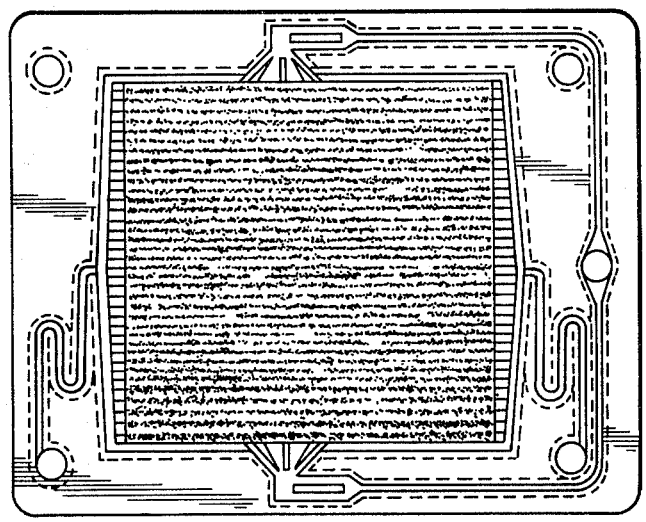
FIG. 2 illustrates a frame of an electrode assembly usable with the separator of FIG. 1.

In use the separator is disposed between adjacent positive and negative electrode assemblies of an electrochemical cell, preferably a metal-halogen cell and more preferably a zinc bromine cell. FIG. 2 shows a representative electrode assembly 2 comprising an electrode 3 and a supporting frame 4. The frame 4 in its peripheral region 5 has a flow manifold 6 for carrying circulating electrolyte to the electrode 3 and through the assembly. Bordering portions of the manifold 6 is a rib 7 shown in dotted line.

When the separator 1 is placed between positive and negative electrode assemblies, such as the assembly 2, and end plates are used to compress the composite, the ribs 6 of the frames 4 engage the periphery area 11 of the separator 1, while the central area 12 of the separator aligns with the electrodes 3. In order for electrolyte passing through each assembly not to leak into the other assembly and to prevent electrolyte from leaking from the composite, engagement of the ribs 6 with the periphery 11 must provide an effective seal.

In accordance with the principles of the present invention, the periphery 11 of the separator 1 is filled with a dielectric elastomer so as to provide a resilient gasket like area for the ribs 6 to embed into and form the desired seal. Preferably, the elastomer is provided by applying a silicone dielectric resin to the periphery area and allowing the resin to saturate the pores of the polymer. The resin is then allowed to cure so as to form the dielectric elastomer which now fills the pores of the polymer.

The resultant periphery area 11, as above mentioned, exhibits excellent resiliency, especially where the separator previously was of a porosity of approximately 50 percent or greater. This resiliency enables the ribs 6 to embed into the periphery area and the area to conform to the ribs so as to provide an excellent seal. Also, the resilient nature of the area allows recovery so that the regions indented by the ribs will return to their original form when the separator 1 is removed from between the electrode assemblies. The separator can then be reused in the same assembly or another assembly without the need to align any indented regions with the ribs of the adjacent frame assemblies.

Additionally, the pores of the periphery area 11 are now filled with the elastomer so that electrolyte cannot migrate to the periphery and saturate same. As a result, shunt current leakage which can cause electrical shorting is eliminated.

The dielectric elastomer may be applied to the periphery area in a manner not only to fill the separator pores, but to leave a film on the separator surface, if greater resiliency is desired. Furthermore, a dielectric elastomer might be developed by a combination of compounds to obtain increased resiliency and dielectric properties. Thus, for example, silicone might be combined with a flurocarbon rubber. In such case, the silicone will act to seal the separator pores and thus eliminate internal leakage currents and the flurocarbon rubber will act as a surface coating of extreme resilience.

In all cases, it is understood that the above-described embodiments are merely illustrative of the many possible specific embodiments which represent applications of the present invention. Numerous and varied other arrangements can readily be devised without departing from the spirit and scope of the invention. Thus, while the dielectric elastomer was shown in FIG. 1 to be applied to a periphery area embodying the entire periphery of the separator 1, it might also have been applied only to a periphery area immediately adjacent to where engagement with the ribs 6 is to be expected.

What I claim is:

1. A separator for use in a metal-halgon cell comprising:
   a polymer sheet material containing a filler, sheet material having a main area and a periphery area, the pores of said sheet material being filled with a dielectric elastomer exclusively in said perphery area, said dielectric elastomer comprising a cured silicone dielectric resin.

2. A separator in accordance with claim 1 wherein:
   said polymer is a high molecular weight polyethylene.

3. A separator in accordance with claim 2 wherein:
   said filler provides a porosity for said sheet material of approximately fifty percent.

4. A separator in accordance with claim 3 wherein:
   said filler is silica.

5. A separator in accordance with claim 1 wherein:
   said dielectric elastomer also coats the surface of said periphery area.

6. A separator in accordance with claim 1 further including:
   a flurocarbon rubber coating the surface of said periphery area.

* * * * *